US008255429B2

(12) United States Patent
Lange et al.

(10) Patent No.: US 8,255,429 B2
(45) Date of Patent: Aug. 28, 2012

(54) CONFIGURATION CHANGE WITHOUT DISRUPTION OF INCOMPLETE PROCESSES

(75) Inventors: Stephan Lange, St. Leon-Rot (DE); Klaus-Peter Lang, Brackenheim-Botenheim (DE); Klaus Eschenroeder, Karlsruhe (DE); Frank Wagner, Neckarsteinach-Neckarhausen (DE); Joachim Fitzer, Schriesheim (DE)

(73) Assignee: SAP AG, Walldorf (DE)

( * ) Notice: Subject to any disclaimer, the term of this patent is extended or adjusted under 35 U.S.C. 154(b) by 472 days.

(21) Appl. No.: 12/336,931

(22) Filed: Dec. 17, 2008

(65) Prior Publication Data

US 2010/0153468 A1 Jun. 17, 2010

(51) Int. Cl.
*G06F 17/30* (2006.01)

(52) U.S. Cl. ...................................... 707/803
(58) Field of Classification Search .............. 707/802, 707/803, 999.102
See application file for complete search history.

(56) References Cited

U.S. PATENT DOCUMENTS

| | | | |
|---|---|---|---|
| 4,079,452 A | 3/1978 | Larson et al. |
| 4,501,528 A | 2/1985 | Knapp |
| 5,307,499 A | 4/1994 | Yin |
| 5,428,791 A | 6/1995 | Andrew et al. |
| 5,459,868 A | 10/1995 | Fong |
| 5,647,056 A | 7/1997 | Barrett et al. |
| 5,657,448 A | 8/1997 | Wadsworth et al. |
| 5,680,624 A | 10/1997 | Ross |
| 5,754,845 A | 5/1998 | White |
| 5,758,062 A | 5/1998 | McMahon et al. |
| 5,857,102 A | 1/1999 | McChesney et al. |
| 5,978,579 A | 11/1999 | Buxton et al. |
| 6,006,035 A | 12/1999 | Nabahi |
| 6,044,461 A | 3/2000 | Agha et al. |
| 6,067,525 A | 5/2000 | Johnson et al. |
| 6,128,730 A | 10/2000 | Levine |
| 6,161,123 A | 12/2000 | Renouard et al. |
| 6,161,176 A | 12/2000 | Hunter et al. |
| 6,185,587 B1 | 2/2001 | Bernardo et al. |
| 6,189,139 B1 | 2/2001 | Ladd |

(Continued)

FOREIGN PATENT DOCUMENTS

JP         2004287972 A      10/2004

(Continued)

OTHER PUBLICATIONS

"U.S. Appl. No. 11/512,442, Non Final Office Action mailed Oct. 1, 2009", 15 pgs.

(Continued)

*Primary Examiner* — Debbie Le

(74) *Attorney, Agent, or Firm* — Schwegman, Lundberg & Woessner, P.A.

(57) ABSTRACT

Various embodiments include one or more of systems, methods, software, and data structures to provide flexibility when configuring systems to new or different processes while not disrupting incomplete processes. Some embodiments include receiving input representative of a configuration change to at least one configuration setting and storing a copy of a setting of the at least one configuration setting from a current configuration to an historical configuration setting storage location. Such embodiments may further include storing the input representative of the configuration change into the current configuration. Following such configuring processes already initiated may be completed according to the copied historical configuration setting and new processes may be initiated according to the new configuration setting. These and other embodiments are described herein.

18 Claims, 8 Drawing Sheets

US 8,255,429 B2

Page 2

U.S. PATENT DOCUMENTS

| | | | |
|---|---|---|---|
| 6,230,305 B1 | 5/2001 | Meares | |
| 6,301,710 B1 | 10/2001 | Fujiwara | |
| 6,321,282 B1 | 11/2001 | Horowitz et al. | |
| 6,324,578 B1 | 11/2001 | Cox et al. | |
| 6,397,232 B1 | 5/2002 | Cheng-Hung et al. | |
| 6,449,624 B1 | 9/2002 | Hammack et al. | |
| 6,453,302 B1 | 9/2002 | Johnson et al. | |
| 6,466,972 B1 | 10/2002 | Paul et al. | |
| 6,470,464 B2 | 10/2002 | Bertram et al. | |
| 6,513,045 B1 | 1/2003 | Casey et al. | |
| 6,523,027 B1 | 2/2003 | Underwood | |
| 6,538,668 B1 | 3/2003 | Ruberg et al. | |
| 6,539,372 B1 | 3/2003 | Casey et al. | |
| 6,728,877 B2 | 4/2004 | Mackin et al. | |
| 6,763,327 B1 | 7/2004 | Songer et al. | |
| 6,804,709 B2 | 10/2004 | Manjure et al. | |
| 6,810,401 B1 | 10/2004 | Thompson et al. | |
| 6,868,392 B1 | 3/2005 | Ogasawara | |
| 7,031,951 B2 | 4/2006 | Mancisidor et al. | |
| 7,032,114 B1 | 4/2006 | Moran | |
| 7,051,130 B1 | 5/2006 | Horowitz et al. | |
| 7,062,502 B1 | 6/2006 | Kesler | |
| 7,089,317 B2 | 8/2006 | Jeyaraman et al. | |
| 7,099,945 B2 | 8/2006 | Lugger et al. | |
| 7,174,400 B2 | 2/2007 | Horowitz et al. | |
| 7,181,731 B2 | 2/2007 | Pace et al. | |
| 7,206,827 B2 | 4/2007 | Viswanath et al. | |
| 7,209,851 B2 | 4/2007 | Singh et al. | |
| 7,228,326 B2 | 6/2007 | Srinivasan et al. | |
| 7,283,816 B2 | 10/2007 | Fok et al. | |
| 7,299,382 B2 | 11/2007 | Jorapur | |
| 7,305,659 B2 | 12/2007 | Muller et al. | |
| 7,337,317 B2 | 2/2008 | Meggitt et al. | |
| 7,340,411 B2 | 3/2008 | Cook | |
| 7,346,766 B2 * | 3/2008 | Mackin et al. | 713/100 |
| 7,360,211 B2 | 4/2008 | Hyden et al. | |
| 7,376,682 B2 | 5/2008 | Ramacher et al. | |
| 7,379,455 B2 | 5/2008 | Pickett | |
| 7,412,497 B2 | 8/2008 | Viswanath et al. | |
| 7,421,621 B1 | 9/2008 | Zambrana | |
| 7,426,694 B2 | 9/2008 | Gross et al. | |
| 7,451,451 B2 | 11/2008 | Schaefer | |
| 7,487,231 B2 | 2/2009 | Brown et al. | |
| 7,519,964 B1 | 4/2009 | Islam et al. | |
| 7,526,457 B2 | 4/2009 | Duevel et al. | |
| 7,540,014 B2 | 5/2009 | Vasishth et al. | |
| 7,546,390 B2 | 6/2009 | Horowitz et al. | |
| 7,590,669 B2 | 9/2009 | Yip et al. | |
| 7,593,124 B1 | 9/2009 | Sheng et al. | |
| 7,599,895 B2 | 10/2009 | Nugent | |
| 7,603,452 B1 * | 10/2009 | Guo | 709/223 |
| 7,606,840 B2 | 10/2009 | Malik | |
| 7,609,651 B1 | 10/2009 | Mcbride et al. | |
| 7,610,582 B2 | 10/2009 | Becker et al. | |
| 7,617,256 B2 | 11/2009 | Mohamed et al. | |
| 7,640,542 B2 | 12/2009 | Herenyi et al. | |
| 7,644,432 B2 | 1/2010 | Patrick et al. | |
| 7,657,887 B2 | 2/2010 | Kothandaraman et al. | |
| 7,665,082 B2 | 2/2010 | Wyatt et al. | |
| 7,685,577 B2 | 3/2010 | Pace et al. | |
| 7,694,181 B2 | 4/2010 | Noller et al. | |
| 7,702,897 B2 * | 4/2010 | Reed et al. | 713/100 |
| 7,716,634 B2 | 5/2010 | Ross et al. | |
| 7,725,200 B2 * | 5/2010 | Reed et al. | 700/30 |
| 7,725,877 B2 | 5/2010 | Andrade et al. | |
| 7,739,657 B2 | 6/2010 | Rolfs | |
| 7,823,124 B2 | 10/2010 | Sattler et al. | |
| 7,827,528 B2 | 11/2010 | Sattler et al. | |
| 7,831,568 B2 | 11/2010 | Sattler et al. | |
| 7,831,637 B2 | 11/2010 | Sattler et al. | |
| 7,908,589 B2 | 3/2011 | Sattler et al. | |
| 7,912,800 B2 | 3/2011 | Sattler et al. | |
| 2001/0044834 A1 | 11/2001 | Bradshaw et al. | |
| 2001/0054091 A1 | 12/2001 | Lenz et al. | |
| 2002/0026572 A1 | 2/2002 | Joory | |
| 2002/0095663 A1 | 7/2002 | Joory | |
| 2002/0099578 A1 | 7/2002 | Eicher et al. | |
| 2002/0104097 A1 | 8/2002 | Jerding et al. | |
| 2002/0116373 A1 | 8/2002 | Nishikawa et al. |
| 2002/0138570 A1 | 9/2002 | Hickey |
| 2002/0147784 A1 | 10/2002 | Gold et al. |
| 2002/0156947 A1 | 10/2002 | Nishio |
| 2002/0188625 A1 | 12/2002 | Jans et al. |
| 2003/0005411 A1 | 1/2003 | Gerken |
| 2003/0023963 A1 | 1/2003 | Birkholz et al. |
| 2003/0115292 A1 | 6/2003 | Griffin et al. |
| 2003/0120780 A1 | 6/2003 | Zhu et al. |
| 2003/0135842 A1 | 7/2003 | Frey et al. |
| 2003/0227392 A1 | 12/2003 | Ebert et al. |
| 2003/0237093 A1 | 12/2003 | Marsh et al. |
| 2004/0019669 A1 | 1/2004 | Viswanath et al. |
| 2004/0019670 A1 | 1/2004 | Viswanath et al. |
| 2004/0031030 A1 | 2/2004 | Kidder et al. |
| 2004/0060047 A1 | 3/2004 | Talati et al. |
| 2004/0088691 A1 | 5/2004 | Hammes et al. |
| 2004/0111417 A1 | 6/2004 | Goto et al. |
| 2004/0176996 A1 | 9/2004 | Powers et al. |
| 2004/0186927 A1 | 9/2004 | Eryurek et al. |
| 2004/0268342 A1 | 12/2004 | Hyden et al. |
| 2005/0007964 A1 | 1/2005 | Falco et al. |
| 2005/0044215 A1 | 2/2005 | Cohen et al. |
| 2005/0044546 A1 | 2/2005 | Niebling et al. |
| 2005/0080801 A1 | 4/2005 | Kothandaraman et al. |
| 2005/0086195 A1 | 4/2005 | Tan et al. |
| 2005/0108219 A1 | 5/2005 | De La Huerga |
| 2005/0108707 A1 | 5/2005 | Taylor et al. |
| 2005/0138558 A1 | 6/2005 | Duevel et al. |
| 2005/0144474 A1 | 6/2005 | Takala et al. |
| 2005/0160419 A1 | 7/2005 | Alam et al. |
| 2005/0188422 A1 | 8/2005 | Jooste |
| 2005/0193103 A1 | 9/2005 | Drabik |
| 2005/0262076 A1 | 11/2005 | Voskuil |
| 2005/0262499 A1 | 11/2005 | Read |
| 2005/0268282 A1 | 12/2005 | Laird |
| 2005/0278202 A1 | 12/2005 | Broomhall et al. |
| 2005/0278280 A1 | 12/2005 | Semerdzhiev et al. |
| 2006/0037000 A1 | 2/2006 | Speeter et al. |
| 2006/0047793 A1 | 3/2006 | Agrawal et al. |
| 2006/0173857 A1 | 8/2006 | Jackson |
| 2006/0184917 A1 | 8/2006 | Troan et al. |
| 2006/0184926 A1 | 8/2006 | Or et al. |
| 2006/0224637 A1 | 10/2006 | Wald |
| 2006/0234698 A1 | 10/2006 | Fok et al. |
| 2006/0242697 A1 | 10/2006 | Takemura |
| 2006/0248450 A1 | 11/2006 | Wittenberg et al. |
| 2006/0253588 A1 | 11/2006 | Gao et al. |
| 2007/0006161 A1 | 1/2007 | Kuester et al. |
| 2007/0016591 A1 | 1/2007 | Beadles et al. |
| 2007/0022323 A1 | 1/2007 | Loh et al. |
| 2007/0025704 A1 | 2/2007 | Tsukazaki et al. |
| 2007/0074203 A1 | 3/2007 | Curtis et al. |
| 2007/0079289 A1 | 4/2007 | MacCaux |
| 2007/0079291 A1 | 4/2007 | Roth |
| 2007/0093926 A1 | 4/2007 | Braun et al. |
| 2007/0097975 A1 | 5/2007 | Rakers et al. |
| 2007/0157185 A1 | 7/2007 | Semerdzhiev et al. |
| 2007/0157192 A1 | 7/2007 | Hoefler et al. |
| 2007/0168065 A1 | 7/2007 | Nixon et al. |
| 2007/0168971 A1 | 7/2007 | Royzen et al. |
| 2007/0198437 A1 | 8/2007 | Eisner et al. |
| 2007/0234274 A1 | 10/2007 | Ross et al. |
| 2007/0234293 A1 | 10/2007 | Noller et al. |
| 2007/0257715 A1 | 11/2007 | Semerdzhiev et al. |
| 2008/0059474 A1 | 3/2008 | Lim |
| 2008/0059490 A1 | 3/2008 | Sattler et al. |
| 2008/0059537 A1 | 3/2008 | Sattler et al. |
| 2008/0059630 A1 | 3/2008 | Sattler et al. |
| 2008/0071555 A1 | 3/2008 | Sattler et al. |
| 2008/0071718 A1 | 3/2008 | Sattler et al. |
| 2008/0071828 A1 | 3/2008 | Sattler et al. |
| 2008/0071839 A1 | 3/2008 | Sattler et al. |
| 2008/0082517 A1 | 4/2008 | Sattler et al. |
| 2008/0126375 A1 | 5/2008 | Sattler et al. |
| 2008/0126448 A1 | 5/2008 | Sattler et al. |
| 2008/0127082 A1 | 5/2008 | Birimisa et al. |
| 2008/0127084 A1 | 5/2008 | Sattler et al. |
| 2008/0127085 A1 | 5/2008 | Sattler et al. |

| | | | |
|---|---|---|---|
| 2008/0127086 | A1 | 5/2008 | Sattler et al. |
| 2008/0127123 | A1 | 5/2008 | Sattler et al. |
| 2008/0195579 | A1 | 8/2008 | Kennis et al. |
| 2009/0024990 | A1 | 1/2009 | Singh et al. |
| 2009/0157455 | A1 | 6/2009 | Kuo et al. |
| 2009/0193439 | A1* | 7/2009 | Bernebeu-Auban et al. . 719/320 |
| 2009/0300416 | A1* | 12/2009 | Watanabe et al. ............... 714/19 |
| 2010/0082518 | A1 | 4/2010 | Gaffga et al. |
| 2010/0153443 | A1 | 6/2010 | Gaffga et al. |
| 2010/0192135 | A1 | 7/2010 | Krishnaswamy et al. |
| 2011/0035629 | A1 | 2/2011 | Noller et al. |

FOREIGN PATENT DOCUMENTS

| | | |
|---|---|---|
| WO | WO-2004114130 A2 | 12/2004 |
| WO | WO-2005045670 A1 | 5/2005 |

OTHER PUBLICATIONS

"U.S. Appl. No. 11/512,443, Examiner Interview Summary mailed Oct. 7, 2009", 4 pgs.

"U.S. Appl. No. 11/512,443, Final Office Action mailed Feb. 6, 2009", 20 pgs.

"U.S. Appl. No. 11/512,443, Non-Final Office Action mailed Jun. 26, 2009", 11 pgs.

"U.S. Appl. No. 11/512,443, Response filed Apr. 3, 2009 to Final Office Action mailed Feb. 6, 2009", 13 pgs.

"U.S. Appl. No. 11/512,443, Response filed Sep. 28, 2009 to Non Final Office Action mailed Jun. 26, 2009", 16 pgs.

"U.S. Appl. No. 11/512,516, Non-Final Office Action mailed Feb. 4, 2009", 12 pgs.

"U.S. Appl. No. 11/512,516, Non-Final Office Action mailed Jul. 10, 2009", 15 pgs.

"U.S. Appl. No. 11/512,516, Response filed Apr. 28, 2009 to Non Final Office Action mailed Feb. 4, 2009", 16 pgs.

"U.S. Appl. No. 11/512,516, Response filed Oct. 9, 2009 to Non Final Office Action mailed Jul. 10, 2009", 9 pgs.

"U.S. Appl. No. 11/512,517, Non-Final Office Action mailed Sep. 16, 2009", 16 pgs.

"U.S. Appl. No. 11/512,517, Notice of Allowance mailed Apr. 3, 2009", 10 pgs.

"U.S. Appl. No. 11/512,519, Final Office Action mailed Feb. 2, 2009", 14 pgs.

"U.S. Appl. No. 11/512,520, Non-Final Office Action mailed Jul. 22, 2009", 14 pgs.

"U.S. Appl. No. 11/512,520, Response filed Oct. 22, 2009 to Non Final Office Action mailed Jul. 22, 2009", 13 pgs.

"U.S. Appl. No. 11/512,609, Non Final Office Action mailed Apr. 27, 2009", 15 pgs.

"U.S. Appl. No. 11/512,609, Response filed Feb. 17, 2009 to Final Office Action mailed Dec. 8, 2008", 10 pgs.

"U.S. Appl. No. 11/512,609, Response filed Jul. 24, 2009 to Non Final Office Action mailed Apr. 27, 2009", 11 pgs.

"U.S. Appl. No. 11/512,886, Examiner Interview Summary mailed Sep. 29, 2009", 2 pgs.

"U.S. Appl. No. 11/512,886, Final Office Action mailed Jun. 24, 2009", 11 pgs.

"U.S. Appl. No. 11/512,886, Response filed Mar. 25, 2009 to Non Final Office Action mailed Dec. 26, 2008", 9 pgs.

"U.S. Appl. No. 11/512,886, Response filed Sep. 22, 2009 to Final Office Action mailed Jun. 24, 2009", 10 pgs.

"U.S. Appl. No. 11/512,443, Response filed Oct. 9, 2008 to Non-Final Office Action mailed Jul. 9, 2008", 11 pgs.

"U.S. Appl. No. 11/512,443 , Non-Final Office Action mailed Jul. 9, 2008", 17 pgs.

"U.S. Appl. No. 11/512,517 , Non-Final Office Action mailed Oct. 29, 2008", 13 pgs.

"U.S. Appl. No. 11/512,517, Response to Non-Final Office Action mailed Jan. 29, 2009", 16 pgs.

"U.S. Appl. No. 11/512,519 response filed Nov. 11, 2008 to Non-Final Office Action mailed Sep. 11, 2008", 15 pgs.

"U.S. Appl. No. 11/512,519 , Non-Final Office Action mailed Sep. 11, 2008", 14 pgs.

"U.S. Appl. No. 11/512,609 , Non Final Office Action mailed on Jun. 19, 2008", 9 pgs.

"U.S. Appl. No. 11/512,609 , Response filed Sep. 19, 2008 to Non-Final Office Action mailed Jun. 19, 2008", 8 pgs.

"U.S. Appl. No. 11/512,609, Final Office Action mailed Dec. 8, 2008", 12 pgs.

"U.S. Appl. No. 11/512,884 , Non-Final Office Action Mailed Jul. 29, 2008", 12 pgs.

"U.S. Appl. No. 11/512,884, Final Office Action mailed Dec. 19, 2008", 11 pgs.

"U.S. Appl. No. 11/512,886, Non-Final Office Action mailed Dec. 26, 2008", 10 pgs.

"U.S. Appl. No. 11/512,884 , Response filed Sep. 23, 2008 to Non-Final Office Action mailed Jul. 29, 2008", 17 pgs.

"International Application Serial No. PCT/EP2007/007460, International Search Report Nov. 2, 2007", 5 pgs.

"International Application Serial No. PCT/EP2007/007460, Written Opinion Nov. 2, 2007", 7 pgs.

"International Application Serial No. PCT/EP2007/007461. International Search Report Nov. 26, 2007", 7 pgs.

"International Application Serial No. PCT/EP2007/007461, International Search Report mailed Feb. 5, 2008", 8 pgs.

"International Application Serial No. PCT/EP2007/007461, Written Opinion mailed Feb. 5, 2008", 9 pgs.

"International Application Serial No. PCT/EP2007/007462, International Search Report Mailed Mar. 17, 2008", 7 pgs.

"International Application Serial No. PCT/EP2007/007462, Partial International Search Report mailed Dec. 27, 2007", 8 pgs.

"International Application Serial No. PCT/EP2007/007462, Written Opinion Mailed Mar. 17, 2008", 8 pgs.

"International Application Serial No. PCT/EP2007/007490, International Search Report Oct. 26, 2007", 4 pgs.

"International Application Serial No. PCT/EP2007/007490, International Search Report mailed Jan. 24, 2008", 7 pgs.

"International Application Serial No. PCT/EP2007/007490, Written Opinion mailed Jan. 24, 2008", 9 pgs.

"International Application Serial No. PCT/EP2007/007491, International Search Report Oct. 22, 2007", 5 pgs.

"International Application Serial No. PCT/EP2007/007491, Written Opinion Oct. 22, 2007", 6 pgs.

"International Application Serial No. PCT/EP2007/007515, International Search Report Nov. 12, 2007", 8 pgs.

"International Application Serial No. PCT/EP2007/007515, International Search Report mailed Jan. 24, 2008", 8 pgs.

"International Application Serial No. PCT/EP2007/007515, Written Opinion mailed Jan. 24, 2008", 12 pgs.

Indigorose, "Setup Factory", *User's Guide IndigoRose Software Design* No. 2, (Mar. 1998), 82 pgs.

Liu, et al., "A Knowledge-Based Approach to Requirements Analysis", (1995), 26-33.

"U.S. Appl. No. 11/512,442, Final Office Action mailed Apr. 21, 2010", 13 pgs.

"U.S. Appl. No. 11/512,442, Response filed Jan. 4, 2010 to Non Final Office Action mailed Oct. 1, 2009", 10 pgs.

"U.S. Appl. No. 11/512,443, Final Office Action mailed Jan. 22, 2010", 14 pgs.

"U.S. Appl. No. 11/512,443, Response filed Apr. 22, 2010 to Final Office Action mailed Jan. 22, 2010", 12 pgs.

"U.S. Appl. No. 11/512,457, Non-Final Office Action mailed May 13, 2010", 11 pgs.

"U.S. Appl. No. 11/512,516, Final Office Action mailed Mar. 5, 2010", 16 pgs.

"U.S. Appl. No. 11/512,516, Response filed Apr. 30, 2010 to Final Office Action mailed Mar. 5, 2010", 9 pgs.

"U.S. Appl. No. 11/512,517, Examiner Interview Summary mailed Dec. 24, 2009", 3 pgs.

"U.S. Appl. No. 11/512,517, Notice of Allowance mailed Jan. 21, 2010", 8 pgs.

"U.S. Appl. No. 11/512,517, Response filed Dec. 14, 2009 to Non Final Office Action mailed Sep. 16, 2009", 8 pgs.

"U.S. Appl. No. 11/512,520, Notice of Allowance mailed Jan. 25, 2010", 6 pgs.

"U.S. Appl. No. 11/512,608, Non-Final Office Action mailed May 12, 2010", 12 pgs.

"U.S. Appl. No. 11/512,609, Final Office Action mailed Nov. 20, 2009", 15 pgs.
"U.S. Appl. No. 11/512,886, Notice of Allowance mailed Dec. 24, 2009", 8 pgs.
"European Application Serial No. 09012347.2, Extended European Search Report mailed Nov. 26, 2009", 5 pgs.
Krintz, Chandra J., ""Reducing load delay to improve performance of Internet-computing programs"", University of California, San Diego, (2001), 225 pgs.
"U.S. Appl. No. 11/511,357 Non-Final Office Action mailed Jul. 2, 2010", 11 pgs.
"U.S. Appl. No. 11/512,441, Non-Final Office Action mailed Jun. 21, 2010", 8 pgs.
"U.S. Appl. No. 11/512,442, Response filed Jun. 21, 2010 to Final Office Action mailed Apr. 21, 2010", 9 pgs.
"U.S. Appl. No. 11/512,518, Non-Final Office Action mailed May 27, 2010", 14 pgs.
"U.S. Appl. No. 11/512,520, Notice of Allowance mailed Jun. 15, 2010", 6 pgs.
"U.S. Appl. No. 11/512,440, Non-Final Office Action mailed Jun. 17, 2010", 14 pgs.
Bellissard, Luc, et al., "Component-based Programming and Application Management with Olan, Proceedings of Workshop on Distributed Computing", Retrieved on [Jun. 15, 2010] Retrieved from the Internet:URL<http://www.springerlink.com/contenUf2g8rl4083393124/fu litext. pdf>, (1995).
Hwang, Jeong Hee, et al., "Context Based Recommendation Service in Ubiquitous Commerce", Database Laboratory, Chungbuk National University, Korea, Springer—Verlag Berlin Heidelberg,, (2005).
"U.S. Appl. No. 11/512,440, Notice of Allowance mailed Nov. 21, 2010.", 14 pgs.
"U.S. Appl. No. 11/512,440, Response filed Oct. 18, 2010 to Non Final Office Action mailed Jun. 17, 2010", 11 pgs.
"U.S. Appl. No. 11/512,441, Final Office Action mailed Dec. 1, 2010", 7 pgs.
"U.S. Appl. No. 11/512,441, Non Final Office Action mailed Mar. 23, 2011", 9 pgs.
"U.S. Appl. No. 11/512,441, Notice of Allowance mailed Jul. 19, 2011", 13 pgs.
"U.S. Appl. No. 11/512,441, Response filed Mar. 1, 2011 to Final Office Action mailed Dec. 1, 2010", 8 pgs.
"U.S. Appl. No. 11/512,441, Response filed Sep. 21, 2010 to Non Final Office Action mailed Jun. 21, 2010", 8 pgs.
"U.S. Appl. No. 11/512,442, Non Final Office Action mailed Feb. 7, 2011", 14 pgs.
"U.S. Appl. No. 11/512,443, Notice of Allowance mailed Sep. 21, 2010", 17 pgs.
"U.S. Appl. No. 11/512,457, Notice of Allowance mailed Aug. 13, 2010", 13 pgs.
"U.S. Appl. No. 11/512,457, Notice of Allowance mailed Sep. 17, 2010", 7 pgs.
"U.S. Appl. No. 11/512,457, Response filed Aug. 5, 2010 to Non Final Office Action mailed May 13, 2010", 10 pgs.
"U.S. Appl. No. 11/512,516 Non-Final Office Action mailed Jul. 8, 2010", 20 pgs.
"U.S. Appl. No. 11/512,516, Final Office Action mailed Dec. 22, 2010", 23 pgs.
"U.S. Appl. No. 11/512,516, Response filed Oct. 8, 2010 to Non Final Office Action mailed Jul. 8, 2010", 11 pgs.
"U.S. Appl. No. 11/512,517, Non-Final Office Action mailed Aug. 16, 2010", 30 pgs.
"U.S. Appl. No. 11/512,517, Notice of Allowance mailed Feb. 8, 2011", 10 pgs.
"U.S. Appl. No. 11/512,517, Response filed Nov. 16, 2010 to Non Final Office Action mailed Aug. 16, 2010", 8 pgs.
"U.S. Appl. No. 11/512,518 Final Office Action mailed Oct. 15, 2010", 15 pgs.
"U.S. Appl. No. 11/512,518, Response filed Aug. 24, 2010 to Non Final Office Action mailed May 27, 2010", 10 pgs.
"U.S. Appl. No. 11/512,520 Notice of Allowance mailed Sep. 29, 2010", 6 pgs.
"U.S. Appl. No. 11/512,608 Notice of Allowance mailed Sep. 8, 2010", 8 pgs.
"U.S. Appl. No. 11/512,608, Notice of Allowance mailed Aug. 13, 2010", 9 pgs.
"U.S. Appl. No. 11/512,608, Response filed Aug. 5, 2010 to Non Final Office Action mailed May 12, 2010", 10 pgs.
"U.S. Appl. No. 12/243,827, Notice of Allowance mailed Jul. 29, 2011", 10 pg s.
"U.S. Appl. No. 12/332,513, Non Final Office Action mailed Mar. 28, 2011", 20 pgs.
"U.S. Appl. No. 12/332,513, Response filed Jun. 28, 2011 to Non Final Office Action mailed Mar. 28, 2011", 11 pgs.
"U.S. Appl. No. 12/332,513, Examiner Interview Summary mailed Mar. 23, 2011", 3 pgs.
Brown, Wanda Jones, et al., ""Configuration Management Plan for the Science Data Processing System"", Upper Marlboro, Maryland, (Apr. 2001).
Dotoli, et al., "A decision support system for the supply chain configuration", IEEE, (Oct. 8, 2003), 6 pgs.
Ganguly, et al., "Reducing Complexity of Software Deployment with Delta Configuration", IEEE, (May 21, 2007), 729-732.
Gu, Mingyang, et al., "Component Retrieval Using Conversational Case-Base Reasoning", IEA/AIE, Annecy, France, (Jun. 27-30, 2006), 12 pgs.
Jan, EA-EE, et al., "A novel approach for proper name transliteration verification", Chinese Spoken Language Processing (ISCSLP), DOI: 10.1109/ISCSLP.2010.5684842, (2010), 89-94.
Kahl, Fredrik, et al., "Critical configurations for n-view projective reconstruction", IEEE, (Dec. 14, 2001), 6 pgs.
Lingamarla, Sridevi, et al., "System for Automated Validation of Embedded Software in Multiple Operating Configurations", IEEE, 4 pgs.
Othman, M., et al., "Analysis of TCP-Reno and TCP-Vegas over AOMDV routing protocol for mobile ad hoc network", Advanced Communication Technology (ICACT), 2010 The 12th International Conference on vol. 2, (2010), 1104-1108.
Park, Young, "Software retrieval by samples using concept analysis", Journal of Systems and Software 54, (2000), 179-183.
Sloane, et al., "Modeling Deployment and Configuration of Cobra Systems with UML", IEEE, (2000), 778.
Tseng, Chiu-Yu, et al., "An initial investigation of L1 and L2 discourse speech planning in English", Chinese Spoken Language Processing (ISCSLP), DOI: 10.1109/ISCSLP.2010.5684851, (2010), 55-59.
Virgilo, "A Rule-based Approach to Content Delivery Adaptation in Web Information Systems", Proc. 7th International Conference on Mobile Data Management, IEEE, (May 12, 2006), 4 pgs.
Ying Li, et al., "Modeling and Verifying Configuration in Service Deployment", IEEE, (2006), 8 pgs.
US 7,571,147, 08/2009, Sattler et al. (withdrawn)
US 7,730,006, 06/2010, Wiesloch et al. (withdrawn)

* cited by examiner

CONFIGURATION CHANGE WITHOUT DISRUPTION OF INCOMPLETE PROCESSES

BACKGROUND INFORMATION

Configuring software applications can be a difficult task. The difficulty in configuring such systems grows in complexity as the size of the software application increases. An example of a complex software application to configure is an enterprise resource planning ("ERP") application. Efforts to configure such applications often involve a large number of employees and even consultants. These efforts may string out over many months, and even multiple years. Further, modifying a large software application configuration or upgrading such an application can, depending on the size of the configuration modification project or scope of the application upgrade, may involve equal amounts of time and cost as an initial implementation.

A major cause for the complexity of modifying and upgrading such software applications is that configuration settings are often stored in configuration tables. The configurations settings in these tables typically do not provide any context of what the configuration settings are for, other than by reference to a manual or from the experience of person modifying the setting. Further, when modifying an existing configuration, care must be taken not to disrupt incomplete processes, such as unfulfilled product orders that include contractual terms that cannot be violated. Removing a configuration from a productive environment often causes such issues. As a result, processes may break and not be able to complete or, worse yet, cause an organization to incur legal liability. Thus, modifying application configurations is time consuming and expensive and data fixes to existing processes are often needed after a configuration change.

DETAILED DESCRIPTION

Figure 1:
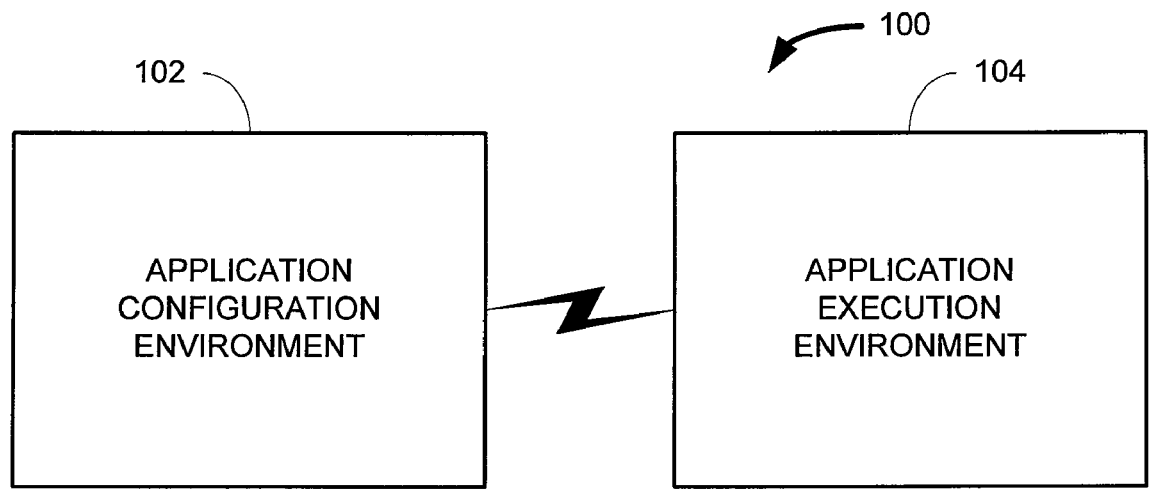
FIG. 1 is a block diagram of a system according to an example embodiment.

Many software solutions, such as Enterprise Resource Planning (ERP) software applications, are difficult to adapt to new business requirements once implemented. Adaptation can be very expensive and time consuming typically because it requires consultants to change configuration settings in the system and to migrate data to the new settings. System down time is often required. In some instances adaptation is nearly impossible.

Various embodiments include one or more of systems, methods, software, and data structures to provide great flexibility when adapting software applications, such as ERP applications, to new or different processes. Such embodiments allow instances of software applications to be quickly and easily adapted to meet rapidly changing technological and business needs while handling continuing and previously completed processes without disruption. These and other embodiments are described below with reference to the figures.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

FIG. 1 is a block diagram of a system 100 according to an example embodiment. The system 100 includes an application configuration environment 102 and an application execution environment 104.

The application configuration environment 102 is a system 100 environment within which an application can be configured. However, the application will, or does, execute within the application execution environment 104. In some embodiments, this arrangement of the application configuration environment 102 and the application execution environment 104 separates the configuration of an application from the environment within which it executes. When an application configuration has been established, all or part of the configuration can then be deployed to the application execution environment 104. This deployment can occur to one or more separate instance of the application in the application execution environment 104. Although only a single application execution environment 104 is illustrated, multiple application execution environments 104 can exist, and the deployment can be made to one or more of the multiple application execution environments 104. Further, although this embodiment includes the application execution environment 102 as a distinct environment within which applications may be configured, other embodiments may be implemented where the configuring occurs in the same environment within which an application being configured is configured, such as the application execution environment 104.

Figure 2:
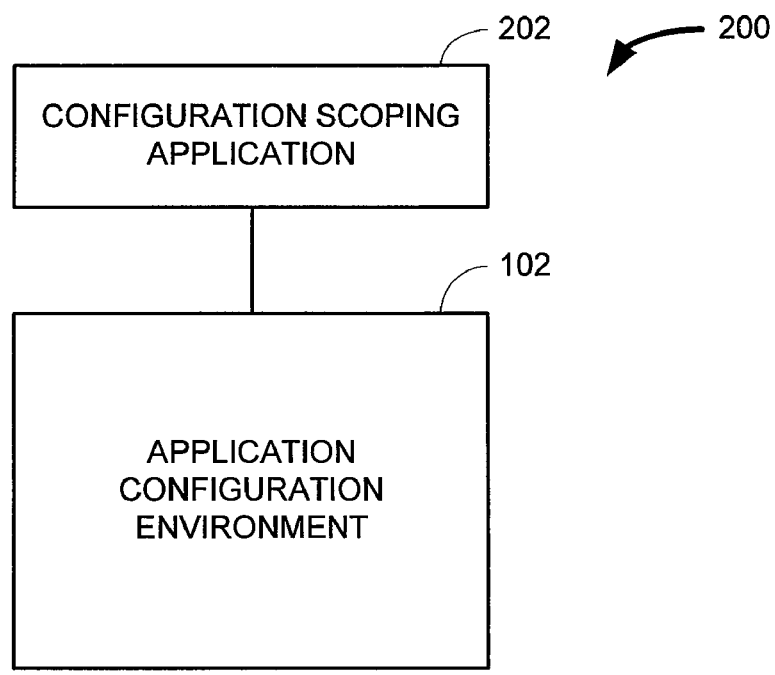
FIG. 2 is a block diagram of a system according to an example embodiment.

FIG. 2 is a block diagram of a system 200 according to an example embodiment. The system 200 includes a configuration scoping application 202 and the application configuration environment 102.

The configuration scoping application 202 typically is a software tool that executes on a computing device, such as a portable computer, on a same computing device within which the application configuration environment 102 exists and may execute, or on another computing device that can be communicatively coupled to the application configuration environment 102. For example, a web enabled interface may be included in some embodiments that is accessible over the Internet, an Intranet, or other similar public or private network, for configuring a software application.

The configuration scoping application 202, when executed, typically presents a set of scoping questions to a user. The scoping questions are linked to one of many adaptation catalog entries. The adaptation catalog entries include a representation of all of the solution capabilities of an application to be configured, and eventually executed. In some embodiments, the solution capabilities are hierarchically divided into areas, packages, topics, and options. There may be multiple areas and each area may have multiple packages. Each package may have multiple topics and each topic may have multiple options.

In some embodiments, such as in an example embodiment where the application to be configured is an ERP application, the adaptation catalog may provide in the area Sales, a package Customer Order Management that contains the topics Sales Order Quote, Sales Order, Sales Order Analysis, and others. On that level, one or more options typically exist such as Approval Processing.

In the configuration scoping application 202, as stated above, each scoping question may be linked to an adaptation catalog entry. An adaptation catalog entry further includes a rule. These rules typically model dependencies between the areas, packages, topics, and options and corresponding solution capabilities of the application. A rule may specify required inclusion or exclusion of other areas, packages, topics, or options, or may require specification of further areas, packages, topics, or options. A rule may also specify a recommendation or default area, package, topic, or option.

For example, a first example scoping question, "What is the primary focus of your business?" may have three possible answers including "Sales," "Service," and "Logistics." Such a first scoping question typically is aimed at identifying an area of business in which the application is going to be used. Answering "Sales" typically tells the configuration scoping application 202 that the area is "Sales" and a rule tied to the adaptation catalog entry for "Sales" specifies dependencies with packages, topics, and options and the corresponding solution capabilities of the application necessary or optional in using the application in a sales business. Such a rule can also specify that other packages, topics, and options and the corresponding solution capabilities are excluded.

Figure 3:
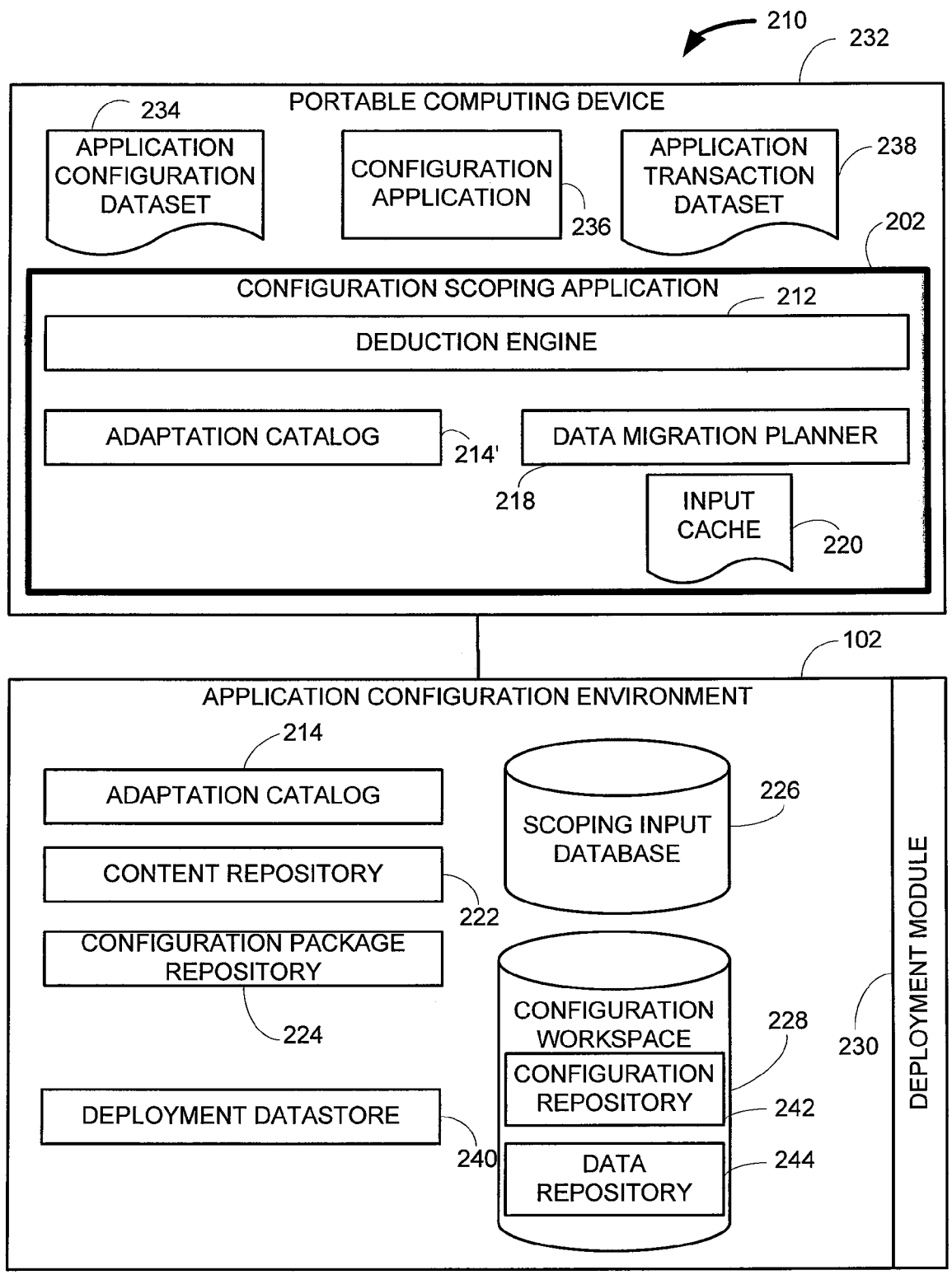
FIG. 3 is a block diagram of a system according to an example embodiment.

Thus, when a user answers, or modifies answers to, scoping questions, the application is being configured. Further, when a question is answered, or a modification is made to an answer, that is associated with an adaptation catalog entry having a rule that excludes another area, package, topic, or option, that rule may be applied to eliminate questions from consideration or require, or otherwise request, an answer to another question. Conversely, when a question is answered that is associated with an adaptation catalog entry having a rule that requires another area, package, topic, or option, that same rule may be applied to determine a next question, or group of questions, to ask a user. However, in the event that a question is not answered that is linked to a rule providing defaults, the question may be skipped without adversely affecting the application configuration. FIG. 3 provides further detail of some embodiments of the configuration scoping application 202 in conjunction with an embodiment of the application configuration environment 102.

FIG. 3 is a block diagram of a system 210 according to an example embodiment. The system 210 includes a portable computing device 232 including a configuration application 236, an application configuration dataset 234 stored in a memory, an application transaction dataset 238, and the configuration scoping application 202. The system 210 further includes the application configuration environment 102. Although the application configuration environment 102 is not illustrated within the portable computing device 232, in some embodiments, the application configuration environment 102 may reside within the portable computing device 232. In other embodiments, the application configuration environment 102, the configuration scoping application 202, the application configuration dataset 234, the configuration application 236, and the application transaction dataset 238 may all reside on a computing device other than the portable computing device 232, such as on the same computing device as the application configuration environment 102.

The configuration application 236, in some embodiments, provides a set of tools via user interfaces to a user. The tools of the configuration application 236 may allow the user to modify answers to scoping question answers stored in an input cache 220 of the configuration scoping application 202, the application configuration dataset 234, and the application transaction dataset 238. The application configuration dataset 234 may be populated with data copied from a configuration repository 242 stored within a configuration workspace 228 of the application configuration environment 102. The application transaction dataset 238 may be populated with data copied either from a demonstration dataset stored in data repository 244 of the configuration workspace 228 or from the content repository 222. The application transaction dataset 238 may include actual transaction data from an application instance in the application configuration environment 102. The user interfaces that allow modification of the application configuration dataset 234 may allow a user to fine-tune configuration settings, set and modify master data, such as addresses, customer contacts, organizational graphics for printing on documents and display within the computer application, and similar data.

Although the input cache 220 is illustrated within the configuration scoping application 202, the input cache 220 may exist separate from the configuration scoping application 202 within a memory of the portable computing device 232. In such embodiments, the input cache 220 may be populated with data copied from the scoping input database 226. As answers to scoping questions are received, the answers and associated configuration settings based on application of rules of the adaptation catalog 214, discussed below, are stored in the input cache 220. When a scoping question answer is modified, the new answer is stored and the previous answer is also stored to keep a historical record of previous answers. The new and previous configuration settings are also stored in the input cache. One purpose of storing the historical record of scoping question answers and associated configuration settings is that when making configuration changes to the computer application being configured, care must be taken not to disrupt processes that are already in progress. When these configuration settings are eventually deployed to the computer application, the historic configuration settings are maintained in the productive system to ensure that such processes may continue to completion with the configuration that they were initiated with. There may be caveats to use of the historic configuration settings, but such caveats are typically set as exceptions to this general rule, such as through fine-tuning the historic settings or making data changes to specific transactions.

For the sake of understandability regarding several portions of the configuration scoping application 202 and the application configuration environment 102, these portions of the system 210 will be discussed followed by a more detailed discussion of the configuration application 236.

The configuration scoping application 202, in some embodiments, includes a deduction engine 212 and an adaptation catalog 214'. In this embodiment, the configuration scoping application 202 further typically includes a data migration planner 218 and the input cache 220.

The application configuration environment 102, in some embodiments, includes an adaptation catalog 214, a content repository 222, and a configuration package repository 224. In some such embodiments, the application configuration environment 102 further includes a scoping input database 226, a configuration workspace 228, a deployment module 230, and a deployment datastore 240.

The adaptation catalog 214 may include a representation of some or all of the solution capabilities of an application to be configured, and eventually executed. Capabilities of an application to be configured are identified in adaptation catalog 214 entries. The adaptation catalog 214 entries each may be identified as an area, package, topic, or option and may be organized in a hierarchy with a child identifying the parent. An example hierarchy is a "General Ledger" capability, which in some embodiments typically is a package having two topics, "cash based" and "accrual based" which are two application capabilities within the "General Ledger" capability.

The adaptation catalog 214 entries may further include scoping questions directed toward obtaining scoping information (i.e., scoping question answers) to determine what areas, packages, topics, and options are relevant to the user's needs. Additionally, the adaptation catalog 214 entries typically include rules, the application of which can require inclusion or exclusion, or specify default inclusion or exclusion, of certain other areas, packages, topics, and options. Thus, because the areas, packages, topics, and options correlate to application capabilities, the inclusion, exclusion, and defaulting specifies what capabilities will be enabled and disabled in the application when deployed or redeployed by the deployment module 230.

In some embodiments, rules and entries in the adaptation catalog can be linked to a configuration package that exists in the configuration package repository 224. A configuration package includes one or more configuration settings that enable or disable functionality of the application when deployed by the deployment module 230 or by a configuration process within the application configuration environment 102 when configuring the application within the configuration workspace 228. A configuration package can further be linked to one or more content items or content item definitions stored in the content repository 222. Some such content types include report layouts, forms, user interfaces, communication specifications, documentation, and other content that can be used in an application when deployed. A communication specification can include an XML schema, an EDI schema and connectivity information, mappings between file layouts and application data storage mechanisms, such as databases, and other similar communication specifications.

The rules of adaptation catalog 214 entries may also be used by the deduction engine 212 of the configuration scoping application 202. The configuration scoping application 202 typically presents a user interface to a user that requests answers to questions. Previous answers to questions may be presented when a user is modifying an existing configuration. The previous answers may be modified and further questions may be asked and answers to other questions may be automatically modified based on newly received answers. The questions to be asked via the user interface may be identified by the deduction engine 212 based on the adaptation catalog 214'. The deduction engine 212 may also cause previously received answers to be modified based on newly received answers. For example, when a newly received answer modifies a previously provided answer, the deduction engine 212 may apply rules of the adaptation catalog 214' which requires or excludes areas, packages, topics or options that were previously included or excluded. The adaptation catalog 214' is typically a copy of the adaptation catalog 214 from the application configuration environment 102. When an answer is received by the configuration scoping application 202 through the user interface, the answer may be stored in the input cache 220 of the configuration scoping application 202. The deduction engine 212 may then apply the rule associated with the adaptation catalog 214' entry of the question asked to the received answer. Through the application of the rule, in view of answers already received, newly received answers, and rules already applied, the deduction engine 212 typically identifies a next question to ask. The identified question is then presented to the user through the user interface. This process typically continues until either all of the questions have been asked, the user is out of time, all changes to previously provided answers have been made, or the user otherwise chooses to stop. If questions remain that have not been answered, the process may be continued at a later time or rules specifying default areas, packages, topics, and options typically supply enough information to allow deployment of the application in a functional form.

In some embodiments, the configuration scoping application 218 may further include a data migration planner 218. In such embodiments, one or more additional scoping questions may be asked. These additional scoping questions are typically directed toward obtaining information from the user about legacy systems and how data is stored within them. In some embodiments, the questions simply may ask what systems are currently in use. In other embodiments, the questions may be more detailed to obtain information such as what type of database an application is utilizing and what type of customization has been made or custom applications developed. The data migration planner 218 may also be used to gather information about a data storage environment to which data is to be migrated to from an existing data storage environment in production. The data migration planner 218 may then use the answers to these additional questions to propose a data migration plan to the new application or new data storage environment.

After the scoping question have been answered, the answers, and any other information obtained from a user of the configuration scoping application 202, the information typically is uploaded to the application configuration environment 102. However, in embodiments, where the configuration scoping application 202 executes on the same computing device as the application configuration environment 202, the scoping question answers and other information may be stored directly to the application configuration environment 102.

When the configuration question answers and other information are uploaded, or otherwise stored to the application environment 102, the scoping question answers are stored to the scoping input database 226. The information stored to the scoping input database 226 may also include historic answers to scoping questions and current and historic configuration settings copied from the input cache 220. The scoping question answers, in some instances, are referred to interchangeably as the "scoping information."

After the current and historic scoping information is within the scoping input database 226, a process within the application configuration environment 102 typically executes to begin configuring an application in the configuration repository 242 of the configuration workspace 228. The configuration repository 242 may include a set of configuration tables that mirrors, at least in part, the configuration tables of the application. The configuration repository 242 may include a set of configuration tables for each of multiple instances of the application to allow use of the application configuration environment 102 to configure multiple application instances. The configuration tables of at least one of the multiple instances of the application may include two sets of tables for each of a current and a historic configuration. In some other embodiments, the configuration tables of one or more of the application instances may include a configuration table schema that tracks current and historic configurations in a single set of configuration tables through use of identifiers of current configurations. Some such embodiments may use a date/time stamp indicia of when certain configuration settings are, were, or will be current. Other indicia and table schemas may be used depending on the requirements of the particular embodiment.

In these embodiments that maintain historic configurations, configuration settings that are no longer current and content that is no longer used in new transactions are typically not deleted. Rather, these configuration settings and content are removed from use in new transactions but remain on the system for use in completing previously initiated transactions. Once the historic configuration settings and historic content are no longer needed, an administrator may remove the historic configuration settings and content from the system manually or through use of a dedicated process, depending on the preference of the administrator and policies of the particular organization.

The process that configures the application may be configured to determine one or more configuration packages to instantiate in the configuration repository 242. Configuration packages, in some embodiments, may include one or a set of configuration settings to enable or disable certain capabilities of the application. Configuration packages, as mentioned above, may be linked to adaptation catalog 214 entries and rules associated with adaptation catalog entries. Thus, the process that configures the application in the configuration repository 242 may be configured to query the scoping information in the scoping input database 226 to identify configuration packages to instantiate.

In some embodiments, demonstration data may exist to facilitate instantiation of a demonstration instance of the application, or a portion thereof, for a sales lead, training session, or other purpose. The demonstration data, in some embodiments, is linked to one or more configuration packages from the configuration package repository 224. The demonstration data typically exists in the content repository 222 so that it can be copied into a set of application tables in the data repository 244 of the configuration workspace 228. These tables may hold such data as transactional data, operational data, master data, or other data that can exist in the application when the application is ready for execution or is executed.

Once the demonstration data is copied to the data repository 244, that data may be fine-tuned to more closely match the intended use of the demonstration data. For example, the system may be configured so that a sales person, or other individual, can fine-tune demonstration data values to more closely match a sales lead's expectations of the application. Such fine tuning may include modifying sales order documents in the demonstration data to include a name, address, and logo of the sales lead's enterprise, or other similar modifications to the demonstration data.

Some embodiments of the application configuration environment 102 may further include the deployment datastore 240. The deployment datastore 240 typically stores a representation of one or more application configurations of applications that have been deployed. The representations of the one or more application configuration may be stored or updated in the deployment datastore 240 by the deployment module 230 upon successful deployment of an application.

A representation of an application configuration typically includes data representative of the application configuration settings. In some embodiments, the representation may further include data representative of content deployed to the application.

The deployment datastore 240, in some embodiments, may be updated upon each configuration or content modification of a deployed system. In some embodiments, the deployment datastore may further include a versioning mechanism that maintains not only a current configuration representation, but also historical representations.

In some embodiments, the deployment datastore 240, or a current copy thereof, may be maintained by an entity that developed, or otherwise offers for sale, the application. The deployment datastore 240 may be used by the entity to monitor current application usage, perform billing processes as a function of a current application configuration, provide application upgrade information based on portions of the application or content utilized, and for other purposes. In some embodiments, the entity may provide application updates, bug fixes, or other upgrades directly to a deployed application instance. Such updates, bug fixes, or other upgrades may be identified as relevant to a particular application instance as a function of the configuration representation in view of adaptation catalog 214 entries.

As described above, the configuration application 236, in some embodiments, may provide a set of tools via user interfaces to a user. The tools of the configuration application 236 typically allow the user to modify answers to scoping question answers stored in an input cache 220, the application configuration dataset 234, and the application transaction dataset 238. The application configuration dataset 234 may be populated with data copied from the configuration repository 242. The application transaction dataset 238 may be populated with data copied from either a demonstration dataset stored in the data repository 244 or from the content repository 222. The input cache 220, if separate from the configuration scoping application 202, may be populated with scoping information copied from the scoping input database 226.

Through use of the configuration application 236 user interfaces, a user may modify data within the application transaction dataset 238 to customize the data used of a demonstration application to more closely reflect how a sales lead's enterprise will use the application. For example, through modifying the transaction data, data displayed within the demonstration may include orders with products, customers, addresses, countries, and other details that truly reflect those of the sales lead's enterprise or may be modified to meet the changing needs of the enterprise in a productive computing environment.

Further, use of the configuration application 236 user interfaces may also allow a user to further refine an application configuration to meet the changing needs of the enterprise. This can include a user taking a copy of an application configuration to work on while away from a connection to the application to be configured or application configuration environment 102, such as when traveling.

Figure 4:
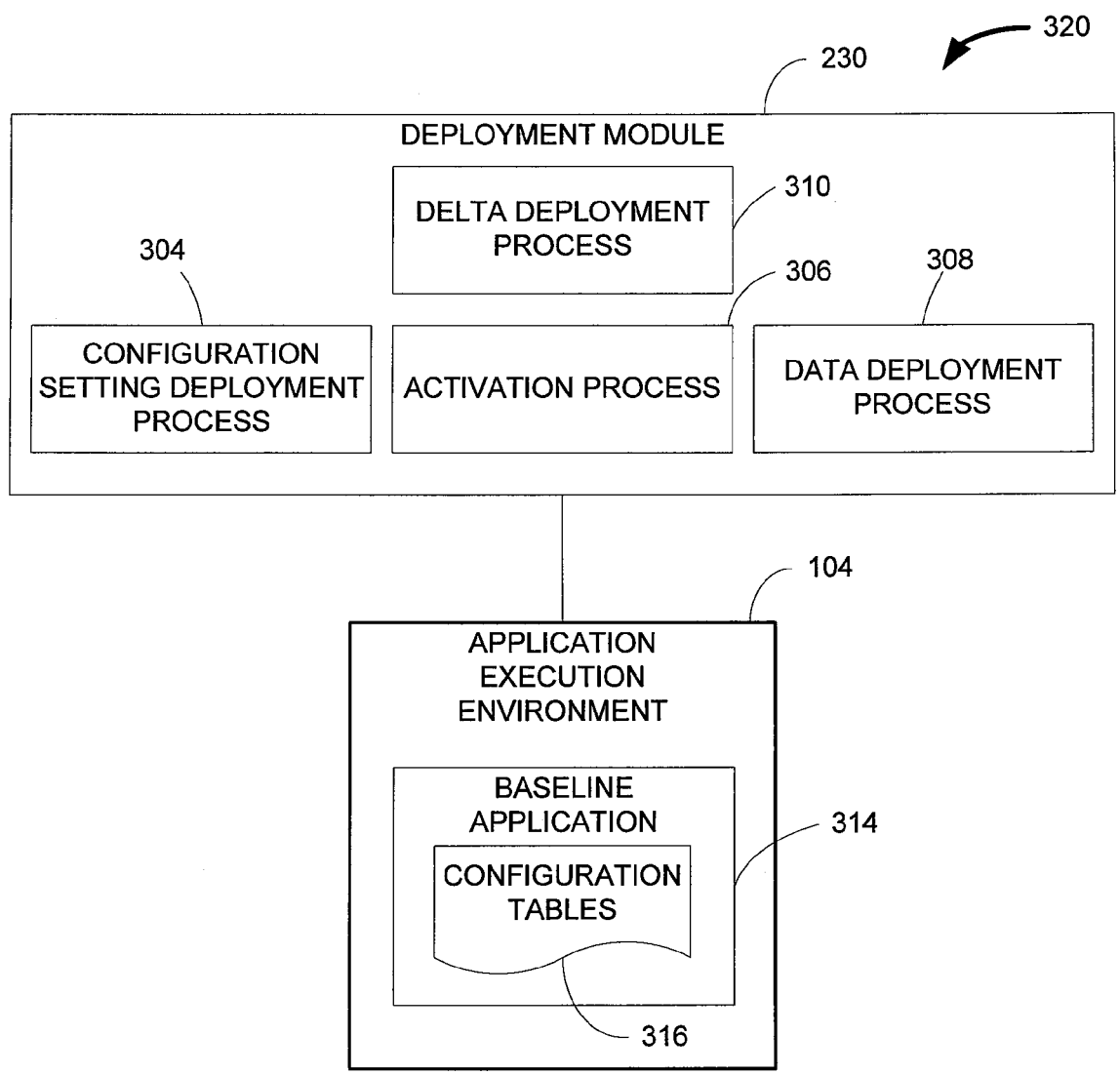
FIG. 4 is a block diagram of a system according to an example embodiment.

After the application has been configured in the configuration workspace 228 and the demonstration data, if any, is ready, the configuration can be deployed by the deployment module 230. Detail of the deployment module 230 is provided in FIG. 4. FIG. 4 is a block diagram of a system 320 according to an example embodiment. The system 320 typically includes the deployment module 320 and the application execution environment 104.

The deployment module 230 may include a configuration setting deployment process 304, an activation process 306, and a data deployment process 308. Some embodiments of the deployment module may further include a delta deployment process 310.

The application execution environment 104 includes an application 314. The application 314 is an application that has been instantiated and most often is already configured. The application 314 may include a set of configuration tables 316 that will be populated and modified by the deployment module 230. The application 314 may further include other tables, data structures, and storage locations that may be populated by the deployment module 230 with one or more of demonstration data, application data, content, or other data.

The deployment module 230, when executed, typically operates to deploy a configuration to the application 314 configured in the application configuration environment. Deployment is typically performed by one or more of the processes of the deployment module 310. These processes may include the configuration setting deployment process 304, the data deployment process 208, the activation process 306, and the delta deployment process 310. Some embodiments of the deployment module 230 may include one or more of these processes.

The configuration setting deployment process 304 typically deploys configuration settings to the configuration tables 326 of the application 314. If the application 314 has already been configure, which is most often the case, configuration settings in the configuration tables 316 that are modified are stored in a manner so as to allow incomplete transactions and processes to complete with the configuration under which they were initiated. However, in some embodiments, if the application 314 has not been instantiated, the configuration setting deployment process 304, or other process of the deployment module may instantiate the application 314 or call another process that will instantiate the application 314. The deployment of the configuration settings may include a copying of configuration settings from the configuration tables of the configuration repository 242, as shown and described with reference to FIG. 3, to the configuration tables 316 of the application 314. As configuration settings are copied, previous configuration settings may be stored in historic configuration tables or other data structures or may simply be marked as historic configuration settings in situ.

In some embodiments, a configuration setting that is copied to the application 314 may refer to an item of content or data stored in the data repository 244, of FIG. 3, or the content repository 222, of FIG. 3. In some such instances, the configuration setting deployment process 304 may call a method of the data deployment process 308 to cause that data or content to be copied to the application 314. In other embodiments, that data or content may be copied when the data deployment process 308 is executed at either an earlier or a later time.

The data deployment process 308 may be executed if there is demonstration data, modified master data, or other data in the configuration workspace 228 or if there is content to deploy from the data repository 244 of FIG. 3 or the content repository 222 of FIG. 3. If there is such data, the data may be copied from the configuration workspace 228 to application tables, data structures, storage locations, or other data stores in the application execution environment 104. If a proper table, data structure, storage location, or other data store does not exist in the application execution environment, the data deployment process 308, in some embodiments, is configured to execute, or call a method of another module, to cause that data location to be created or allocated.

Some embodiments of the deployment module 230 may further include the activation process 306. The activation process, in some embodiments, is configured to execute to activate the application 314 after it has been successfully deployed or redeployed. In some instances, the activation process 314 may require an activation key, message, code, or other authorization from an activation authority to activate the configured application 314. The activation authority may include one or more of a number of individuals or entities. An example of an activation authority may include an entity that developed or is selling the application 314.

In some embodiments, the deployment module 230 may further include the delta deployment process 310. The delta deployment process is typically only relevant after an application has already been deployed. When an application is deployed, or subsequently modified, a representation of the application configuration may be stored or updated in the deployment datastore 240 as described and illustrated with reference to FIG. 3. This may enable certain methods for tracking of a current configuration of a deployed application. In embodiments including the delta deployment process 310, the scoping information may further be tracked on a historical basis to at least allow a view of a current configuration and a modified configuration not yet deployed, if applicable. The delta deployment process 310 may then use that historical tracking of the application configuration to identify changes between the current application configuration and the modified configuration not yet deployed. The delta deployment process 310 may then deploy only the changes to the application configuration and any additional content needed or otherwise referenced by the new application configuration. The historical tracking of configuration settings may also be used to identify previous configurations that have content that is still present in the current configuration. In such instances, the content may not need to be redeployed if it is to be used again. For example, an item of content for a consumer rebate for purchase of a certain product may include a particular content item defining the rebate process. To reactivate the rebate in the application configuration, an historic configuration setting that references the rebate content item may simply be modified from historic to be current.

Figure 5:
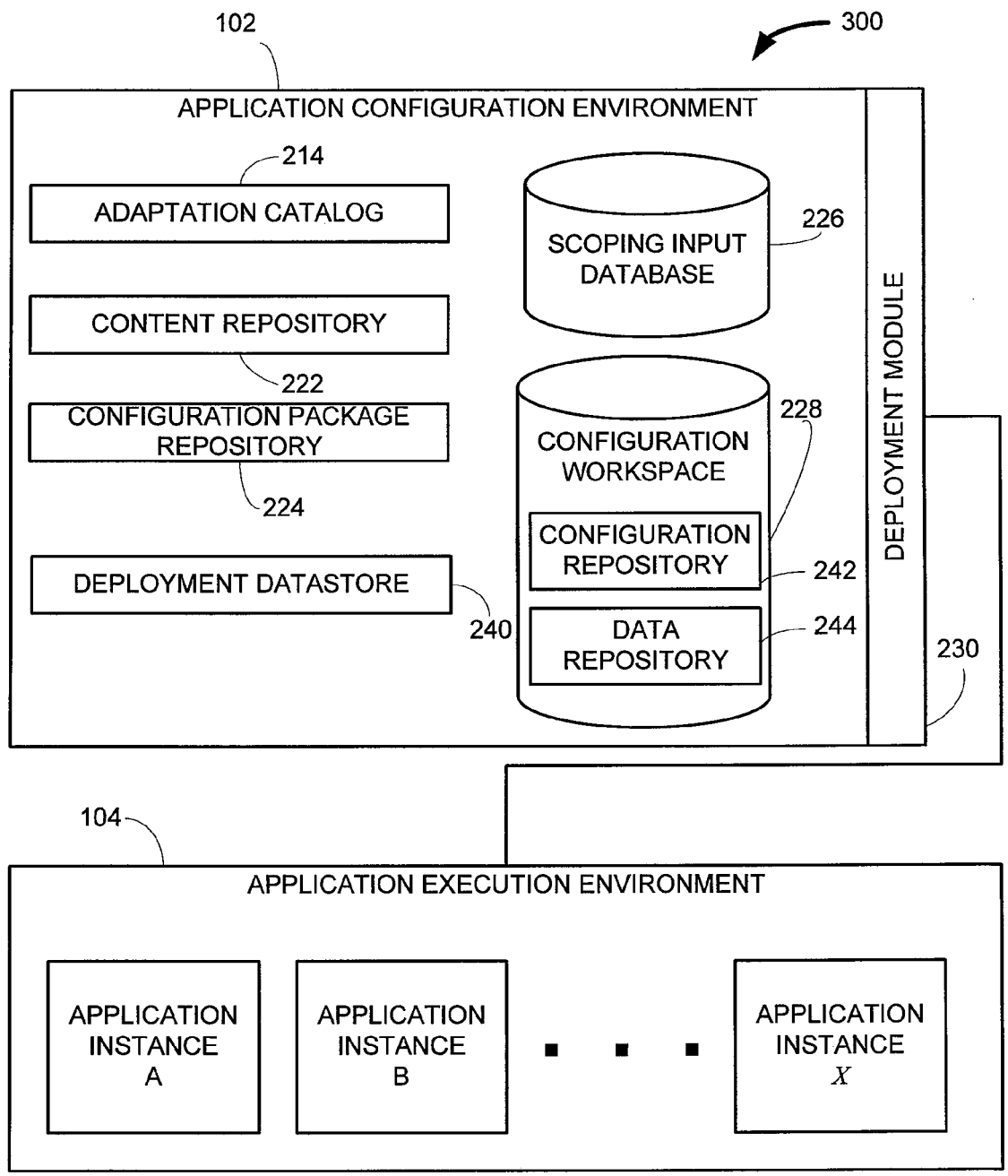
FIG. 5 is a block diagram of a system according to an example embodiment.

FIG. 5 is a block diagram of a system 300 according to an example embodiment. The system 300 includes the application configuration environment 102 as discussed above with regard to FIG. 1, FIG. 2, FIG. 3, and FIG. 4. The system 300 further includes the application execution environment 104.

The application execution environment 104 is a data processing environment within which an application, or an application to be deployed, may execute. When deploying an application, the deployment module 230 typically needs to know what application execution environment 104 and the application instance within that environment to which the deployment is to be made. In embodiments including only one application execution environment 104, the application execution environment 104 may already be known. Similarly, in an application execution environment including only a single application instance, the instance may already be known. However further information may be needed in other embodiments, such as when the application instances are instances of different computer applications from the same or different software development organizations.

Each instance of the application (i.e., application instances A, B, . . . X) typically includes a set of configuration tables which may include distinct configuration settings from one another. In some embodiments, multiple instances of the application may exist such as to provide a development instance, a test instance, and a production instance. In such embodiments where there are multiple application instances of the same application, the deployment module 230 may deploy the configuration settings from one of the application instances in the application execution environment 104 to another application in the same or another application execution environment 104. Although the deployment module 230 is illustrated as being a part of the application configuration environment 102, the deployment module 230, in other embodiments, may be a standalone application or a part of another application or process.

Figure 6:
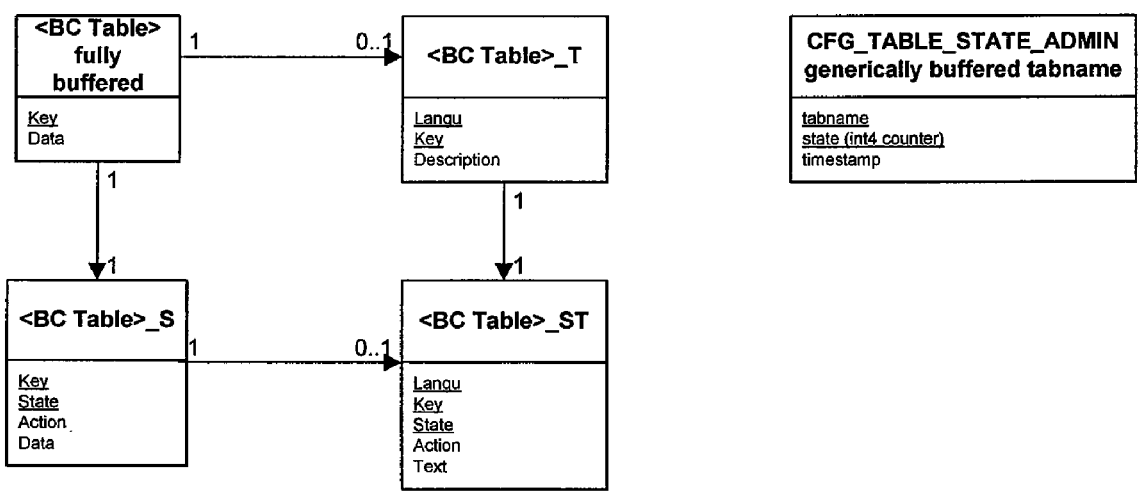
FIG. 6 is a database table relation diagram according to an example embodiment.

FIG. 6 is a database table relation diagram according to an example embodiment. Each block represents a database table with key values underlined. This is an example embodiment of how configuration tables may be used to implement the storing of current and historical configuration settings. One or both of the STATE value and TIMESTAMP columns may be used by various methods, modules, classes, content items, or other elements of computer applications to retrieve the appropriate configuration settings to initiate, continue processing, end or otherwise terminate, or perform other actions. For example, a process may be initiated according to a certain content item, such as a form. When the process is initiated, a date/time stamp may be taken and stored as a value to use as a retrieval argument to retrieve the appropriate configuration setting. In other embodiments, a state value may be stored of the current configuration state. The retrieving of configuration settings may be performed by low-level objects in applications implemented with a service-oriented architecture. In these and in other embodiments, content items may include logic to retrieve configuration settings, or otherwise cause the appropriate configuration settings to be retrieved. In many modern computer applications, certain data items are accessible only through a limited number of objects. To retrofit such applications to utilize historical configuration settings and current configuration settings, these data accessing objects may be modified to determine which configuration settings to retrieve, store, or otherwise process.

Figure 7:
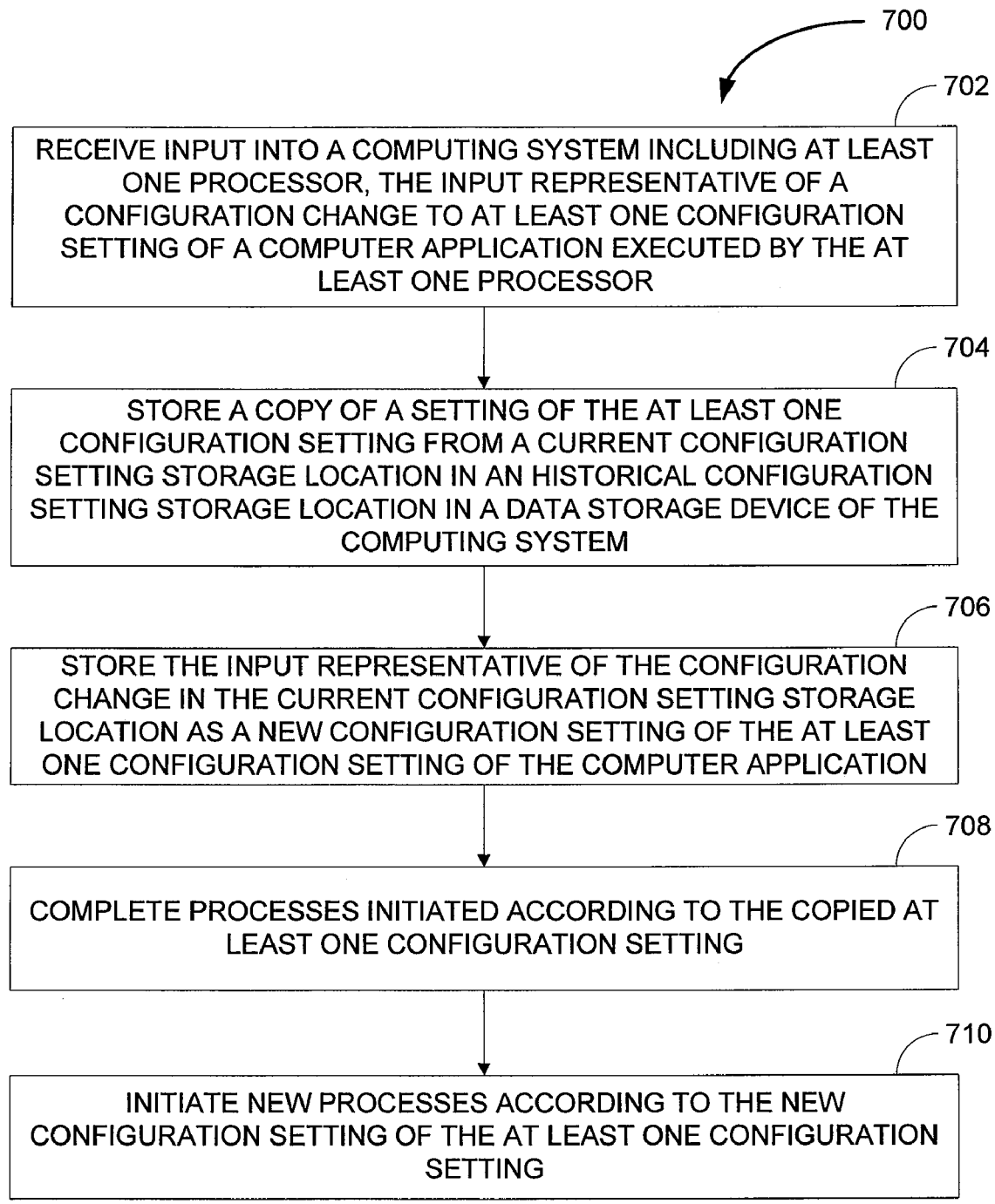
FIG. 7 is a block flow diagram of a method according to an example embodiment.

FIG. 7 is a block flow diagram of a method 700 according to an example embodiment. The method 700 is an example of one method where configuration changes may be made without disrupting incomplete processes. The example method 700 includes receiving 702 input representative of a configuration change to at least one configuration setting of a computer application. The computer application is executed by the at least one processor in a computing system. The method 700 further includes storing 704 a copy of a setting of the at least one configuration setting from a current configuration setting storage location in an historical configuration setting storage location in a data storage device of the computing system. The method may then store 706 the input representative of the configuration change in the current configuration setting storage location as a new configuration setting of the at least one configuration setting of the computer application. Thus, the previous configuration setting is still available for existing, uncompleted processes and for other purposes while the new configuration setting is available for initiation of new processes. The method 700 may then complete 708 processes initiated according to the copied at least one configuration setting and initiate 710 new processes according to the new configuration setting of the at least one configuration setting. Although the completing and initiating 710 portions of the method 700 are illustrated in FIG. 7 in a sequential manner, these portions of the method may alternatively be performed in parallel or individually.

In some embodiments of the method 700, the historical configuration storage location and the current configuration storage location are both the same database table that includes a termination column for each configuration setting stored in the table. The termination column in such embodiments may be populated with data indicating when the respective configuration setting is not a current configuration setting. The data indicating when the respective configuration setting is not a current configuration setting may include data such as a date, a flag value indicating if the respective configuration is current or historical, a value essentially representative of a configuration version number, and other data.

In further embodiments, current and historical configuration settings may each be stored with a configuration setting identifier. In such embodiments, processes initiated according to a set of configuration settings are stored with a reference to the set of configuration settings based on the configuration setting identifier. The configuration setting identifier may be a date-time-stamp of when a respective process was initiated. The configuration of the process may then be retrieved from one or both of the current and historical configuration setting storage locations by a date-time-stamp of an initiated process.

In some embodiments, receiving 702 input representative of a configuration change to the at least one configuration setting may include receiving input specifying that the configuration change is to modify all processes including previously initiated processes. This input may include a configuration change to master data, such as a shipping address when a customer moves to a new location or a person in a position relevant to a process is filled by another individual.

Figure 8:
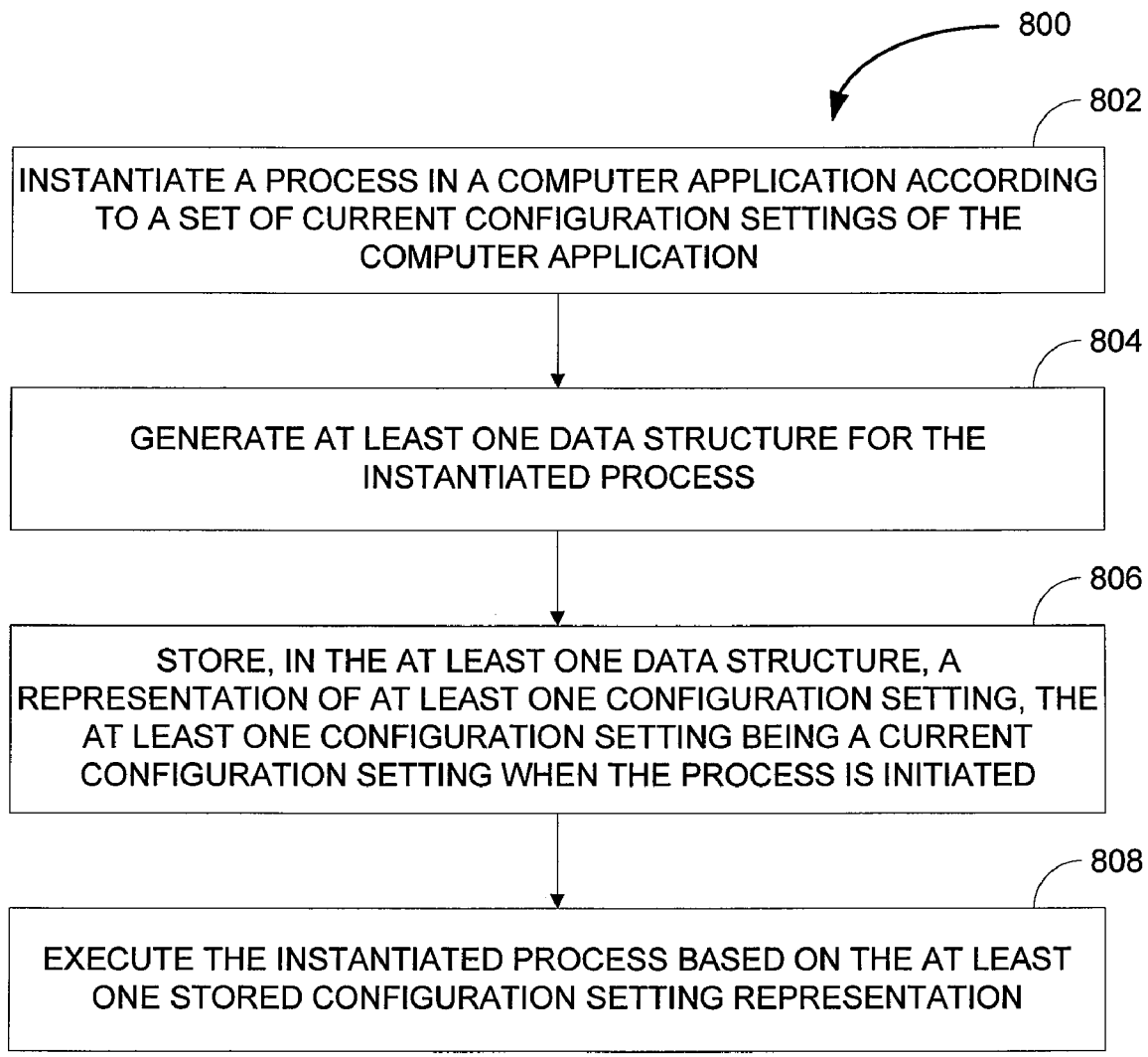
FIG. 8 is a block flow diagram of a method according to an example embodiment.

FIG. 8 is a block flow diagram of a method 800 according to an example embodiment. The method 800 is an example of a method where configuration settings, or a reference thereto, may be stored in a data structure of an initiated process. The method 800 includes instantiating 802 a process in a computer application according to a set of current configuration settings of the computer application and generating 804 at least one data structure for the instantiated process. The method 800 further includes storing 806, in the at least one data structure, a representation of at least one configuration setting, the at least one configuration setting being a current configuration setting when the process is initiated and executing 808 the instantiated process based on the at least one stored configuration setting representation. In some such embodiments, a subsequent modification to a current configuration setting does not impact how the instantiated process is executed.

In the method 800 the representation of the at least one configuration setting current when the process is initiated may be a data item for use as a retrieval argument to retrieve the at least one configuration setting from a configuration setting repository. The data item, in some such embodiments, may be a date time stamp of when the process was initiated. This date time stamp may be a retrieval argument for a process configuration retrieval method that is operable to retrieve process configurations. The process configuration retrieval method may be a method of an object tasked with providing configuration data to other requesting objects and may retrieve data representative of one or both of current and historical configurations. The configuration setting repository discussed above may be local or remote to a system performing the method 800. In some embodiments, the configuration setting repository is a remote database on a server accessible over a computer network.

In some instances, an administrator or a configuration process may need to retrieve certain configuration settings. To facilitate such retrievals, some embodiments are further operable to provide one or both of system and user interfaces to receive a configuration setting query from a requestor, perform the query against both current and historical configuration settings, and provide a result set of from the query to the requester. The system interfaces are typically methods exposed by objects that may be called by logical, non-human users, or from user interfaces that receive queries from human users.

Figure 9:
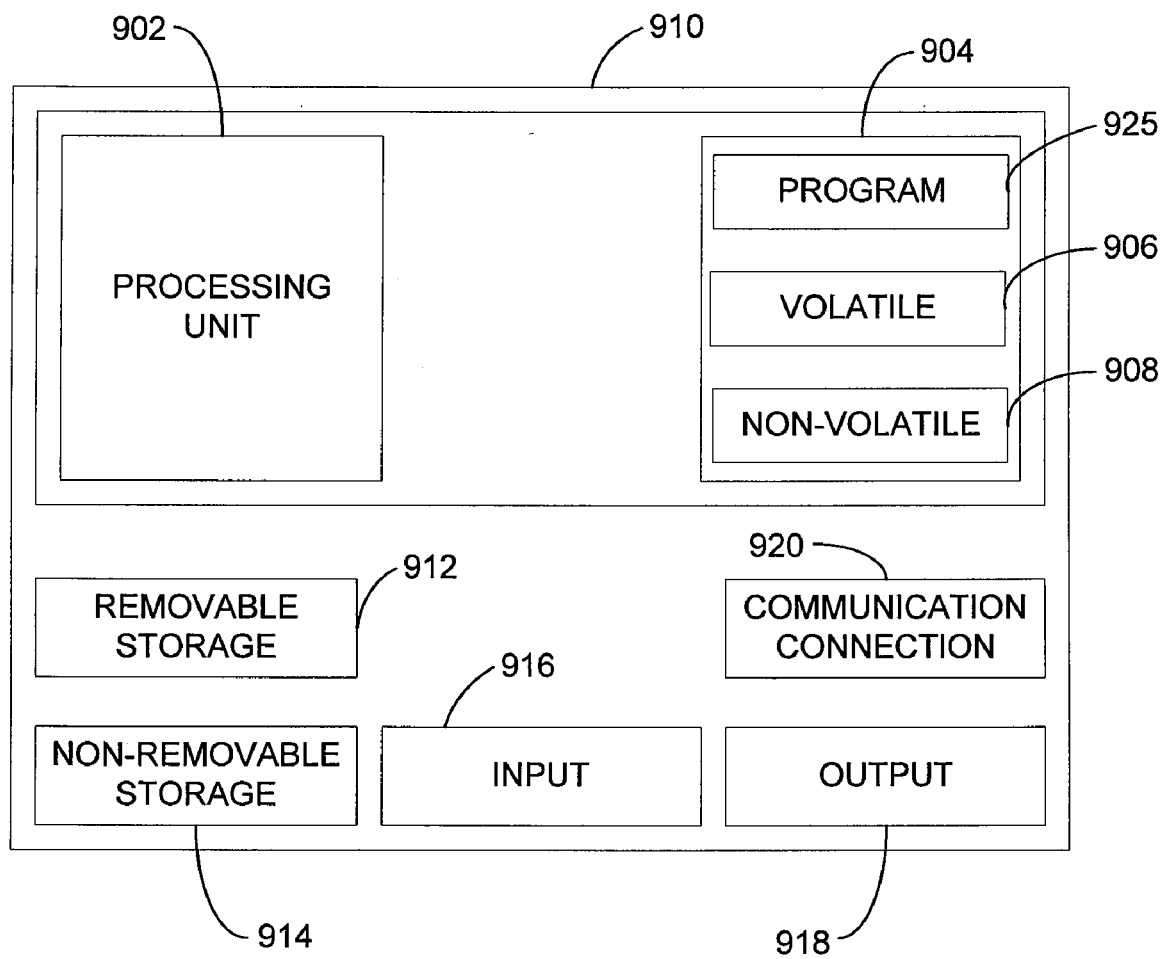
FIG. 9 is a block diagram of a computing device according to an example embodiment.

FIG. 9 is a block diagram of a computing device according to an example embodiment. In one embodiment, multiple such computer systems are utilized in a distributed network to implement multiple components in a transaction based environment. A service-oriented, object-oriented, or other architecture may be used to implement such functions and communicate between the multiple systems and components. One example computing device in the form of a computer 910, may include a processing unit 902, memory 904, removable storage 912, and non-removable storage 914. Memory 904 may include volatile memory 906 and non-volatile memory 908. Computer 910 may include—or have access to a computing environment that includes—a variety of computer-readable media, such as volatile memory 906 and non-volatile memory 908, removable storage 912 and non-removable storage 914. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 910 may include or have access to a computing environment that includes input 916, output 918, and a communication connection 920. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 902 of the computer 910. A hard drive, CD-ROM, and RAM are some examples of articles including a computer-readable medium. For example, a computer program 925 capable of providing a generic technique to perform access control check for data access and/or for doing an operation on one of the servers in a component object model (COM) based system according to the teachings of the present invention may be included on a CD-ROM and loaded from the CD-ROM to a hard drive. The computer-readable instructions allow computer 910 to provide generic access controls in a COM based computer network system having multiple users and servers. In some embodiments, the various methods described herein may be encoded into computer executable code and the code may be stored on a computer readable medium. Example of the such computer executable code may be the configuration scoping application 202 and the various elements described above as being included in the application configuration environment 102 and application execution environment 104.

The various operations of example methods and processes described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods and processes described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs)).

It is emphasized that the Abstract is provided to comply with 37 C.F.R. §1.72(b) requiring an Abstract that will allow the reader to quickly ascertain the nature and gist of the technical disclosure. It is submitted with the understanding that it will not be used to interpret or limit the scope or meaning of the claims.

In the foregoing Detailed Description, various features are grouped together in a single embodiment to streamline the disclosure. This method of disclosure is not to be interpreted as reflecting an intention that the claimed embodiments of the inventive subject matter require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A method comprising:

receiving input into a computing system including at least one processor, the input representative of a configuration change to at least one configuration setting of a computer application executed by the at least one processor;

storing a copy of a setting of the at least one configuration setting from a current configuration setting storage location in an historical configuration setting storage location in a data storage device of the computing system;

storing the input representative of the configuration change in the current configuration setting storage location as a new configuration setting of the at least one configuration setting of the computer application;

completing processes initiated according to the copied at least one configuration setting stored in the historical configuration setting storage location to prevent disruption of incomplete processes; and subsequent to the storing of the input representative of the configuration change as the new configuration setting, initiating new processes according to the new configuration setting of the at least one configuration setting.

2. The method of claim 1, wherein:

the historical configuration storage location and the current configuration storage location are both the same database table;

the database table includes a termination column for each configuration setting stored in the table; and the termination column of configuration settings stored in the table is populated with data indicating when the respective configuration setting is not a current configuration setting.

3. The method of claim 2, wherein the termination column stores at least a date at which respective configuration settings are no longer current configuration settings.

4. The method of claim 1, wherein:

current and historical configuration settings are each stored with a configuration setting identifier; and processes initiated according to a set of configuration settings are stored with a reference to the set of configuration settings based on the configuration setting identifier.

5. The method of claim 4, wherein the configuration setting identifier is a date-time-stamp of when a respective process was initiated and the configuration of the process is retrievable from one or both of the current and historical configuration setting storage locations by a date-time-stamp of an initiated process.

6. The method of claim 1, wherein receiving input representative of a configuration change to the at least one configuration setting includes receiving input specifying a configuration change to master data and an indication to modify all processes including previously initiated processes.

7. A system comprising:

at least processors coupled to a bus;

a memory device coupled to the bus and storing an instruction set executable by the at least one processor to:

receive input representative of a configuration change to at least one configuration setting of a computer application executed at least in part on the system by the at least one processor;

store a copy of a setting of the at least one configuration setting from a current configuration setting storage location in an historical configuration setting storage location in a data storage device of the computing system;

store the input representative of the configuration change in the current configuration setting storage location as a new configuration setting of the at least one configuration setting of the computer application;

complete processes initiated according to the copied configuration setting of the at least one configuration setting stored in the historical configuration setting storage location to prevent disruption of incomplete processes; and subsequent to the storing of the input representative of the configuration change as the new configuration setting, initiate new processes according to the new configuration setting of the at least one configuration setting.

8. The system of claim 7, further comprising:

a network interface coupled to the bus; and wherein the current configuration setting storage location and the historical configuration setting storage location are remote data storage locations accessible via the network interface.

9. The system of claim 7, wherein:

the historical configuration storage location and the current configuration storage location are both the same database table and are accessible over a network interface of the system;

the database table includes a termination column for each configuration setting stored in the table; and the termination column of configuration settings stored in the table is populated with data indicating when the respective configuration setting is not a current configuration setting.

10. The system of claim 9, wherein the termination column stores at least a date at which respective configuration settings are no longer current configuration settings.

11. The system of claim 7, wherein:

current and historical configuration settings are each stored with a configuration setting identifier; and processes initiated according to a set of configuration settings are stored with a reference to the set of configuration settings based on the configuration setting identifier.

12. The method of claim 11, wherein the configuration setting identifier is a date-time-stamp of when a respective process was initiated and the configuration of the process is retrievable from one or both of the current and historical configuration setting storage locations by a date-time-stamp of an initiated process.

13. A non-transitory computer-readable storage medium, with instructions stored thereon, which when executed by computer, cause the computer to perform actions comprising:

receiving input into a computing system including at least one processor, the input representative of a configuration change to at least one configuration setting of a computer application executed by the at least one processor;

storing a copy of a setting of the at least one configuration setting from a current configuration setting storage location in an historical configuration setting storage location in a data storage device of the computing system;

storing the input representative of the configuration change in the current configuration setting storage location as a new configuration setting of the at least one configuration setting of the computer application;

completing processes initiated according to the copied at least one configuration setting stored in the historical configuration setting storage location to prevent disruption of incomplete processes; and subsequent to the storing of the input representative of the configuration change as the new configuration setting, initiating new processes according to the new configuration setting of the at least one configuration setting.

14. The non-transitory computer-readable storage medium of claim 13, wherein:
the historical configuration storage location and the current configuration storage location are both the same database table;
the database table includes a termination column for each configuration setting stored in the table; and
the termination column of configuration settings stored in the table is populated with data indicating when the respective configuration setting is not a current configuration setting.

15. The non-transitory computer-readable storage medium of claim 14, wherein the termination column stores at least a date at which respective configuration settings are no longer current configuration settings.

16. The non-transitory computer-readable storage medium of claim 13, wherein:
current and historical configuration settings are each stored with a configuration setting identifier; and
processes initiated according to a set of configuration settings are stored with a reference to the set of configuration settings based on the configuration setting identifier.

17. The non-transitory computer-readable storage medium of claim 16, wherein the configuration setting identifier is a date-time-stamp of when a respective process was initiated and the configuration of the process is retrievable from one or both of the current and historical configuration setting storage locations by a date-time-stamp of an initiated process.

18. The non-transitory computer-readable storage medium of claim 13, wherein receiving input representative of a configuration change to the at least one configuration setting includes receiving input specifying a configuration change to master data and an indication to modify all processes including previously initiated processes.

* * * * *